United States Patent [19]

Hubbard

[11] 4,407,608
[45] Oct. 4, 1983

[54] METHOD AND APPARATUS FOR CONTROLLING FLUID CURRENTS

[76] Inventor: Thom W. Hubbard, 3319 Pembrook Dr., Sarasota, Fla. 33579

[21] Appl. No.: 287,526

[22] Filed: Jul. 27, 1981

[51] Int. Cl.³ .............................................. E02B 3/06
[52] U.S. Cl. ......................................... 405/31; 405/25
[58] Field of Search ....................... 405/30, 31, 34, 35, 405/21, 23, 25, 74

[56] References Cited

U.S. PATENT DOCUMENTS

| | | | |
|---|---|---|---|
| 810,630 | 1/1906 | Dwight | 405/31 |
| 919,788 | 4/1909 | Smith | 405/31 |
| 1,175,962 | 3/1916 | Latham | 405/31 |
| 1,375,232 | 4/1921 | Rush | 405/31 |
| 3,415,061 | 12/1968 | Staempfli | 405/31 X |
| 3,538,710 | 11/1970 | Tourmen | 405/31 |
| 3,913,333 | 10/1975 | Hubbard | 405/31 |

*Primary Examiner*—David H. Corbin
*Attorney, Agent, or Firm*—Hauke & Patalidis

[57] ABSTRACT

A unitized modular structure is provided for utilizing the kinetic energy in waves, tides and winds to effect deposits of fluid entrained alluvium. The modular structure is formed of individual modular elements each of which has a sloping rear surface and a generally concave surface along the front thereof. The modular elements are reinforced interiorly, and certain of the elements are provided with integral foot members to position, stabilize and anchor the unitized structure during and after installation.

13 Claims, 10 Drawing Figures

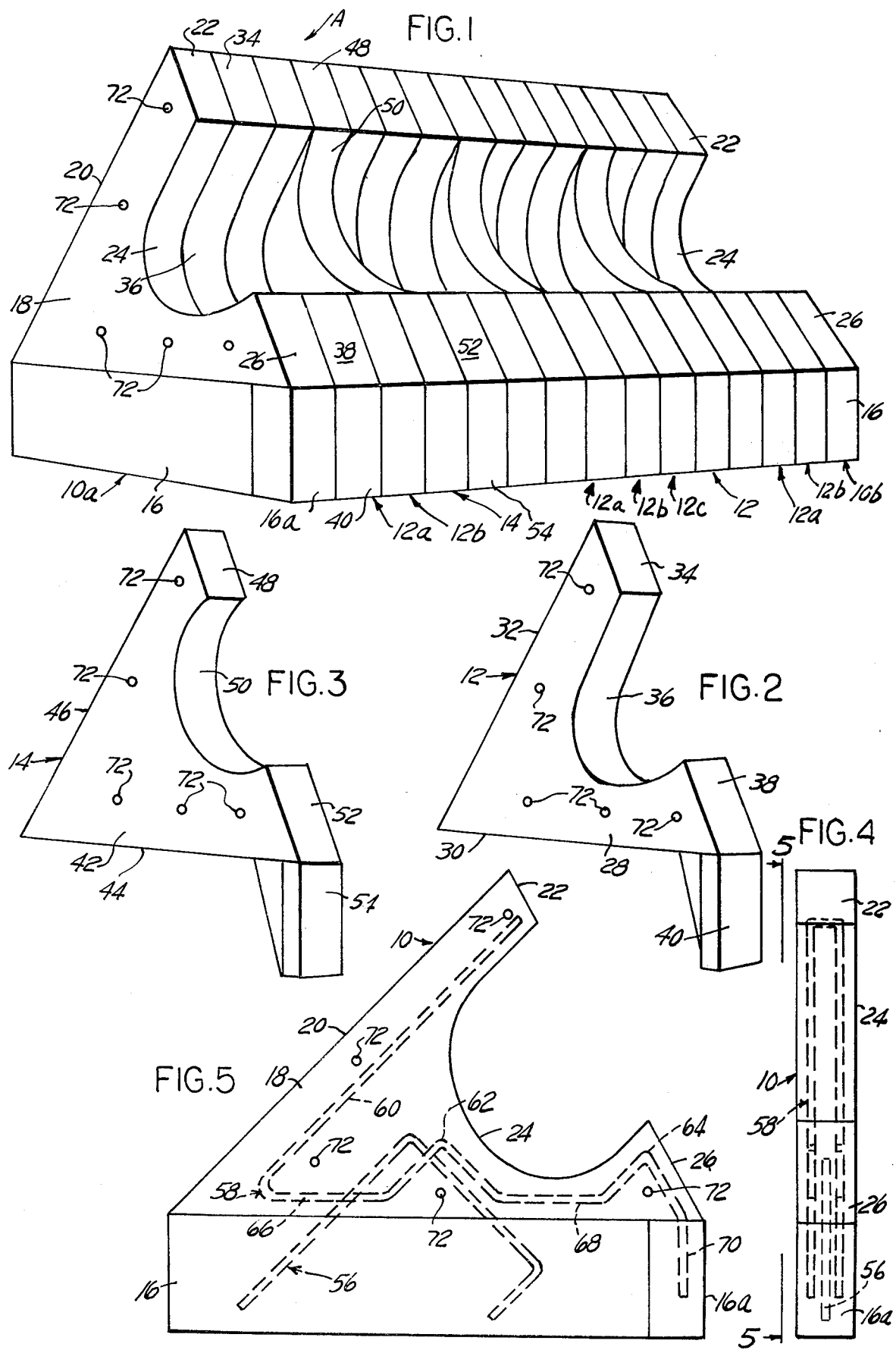

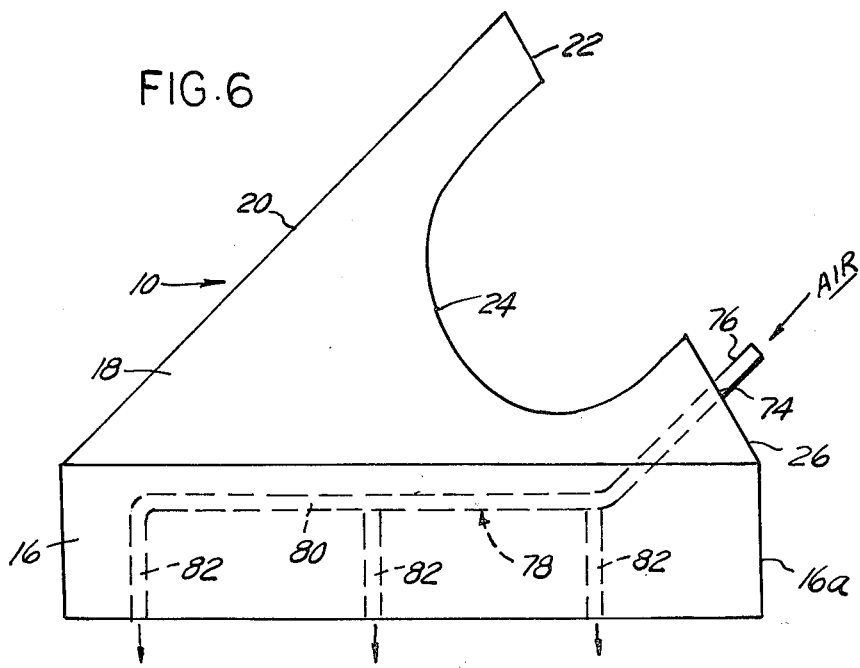
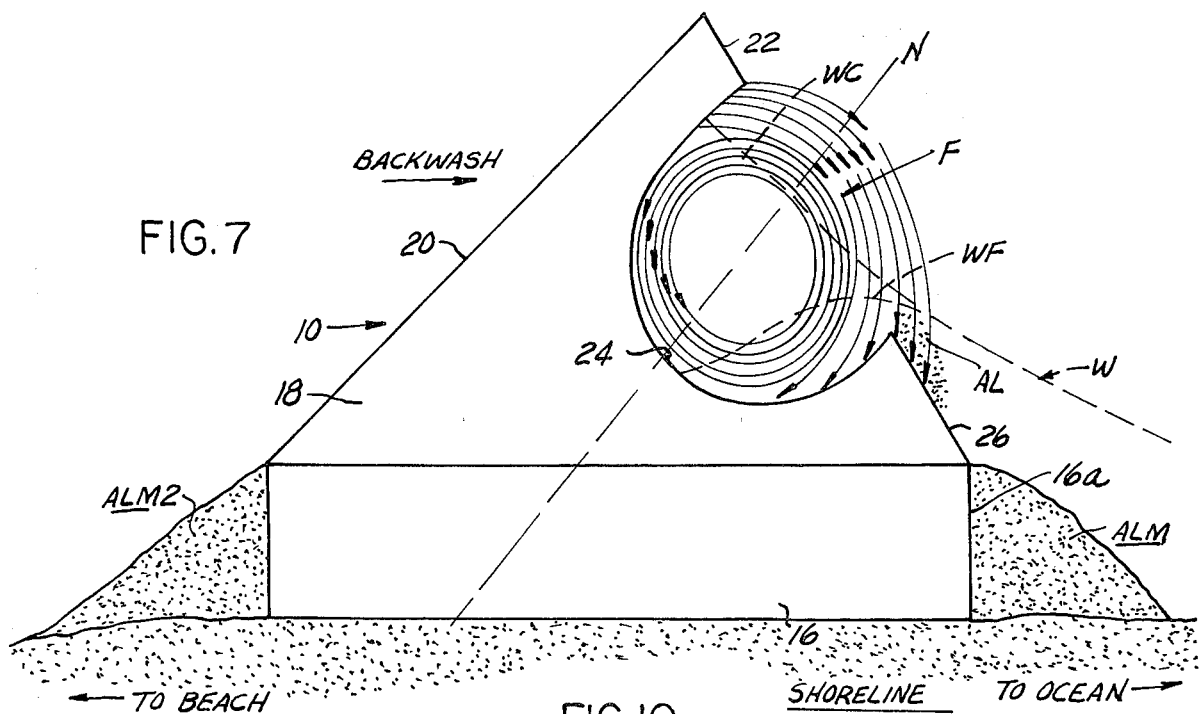
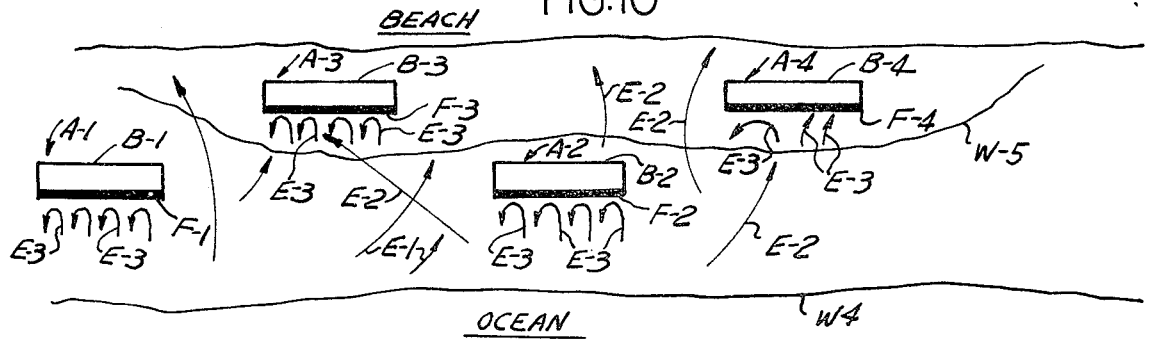

METHOD AND APPARATUS FOR CONTROLLING FLUID CURRENTS

BACKGROUND OF THE INVENTION

It has long been known that winds, tides and other fluid currents produce deleterious effects upon beaches, shorelines, channels and the like. The erosion of beaches, silting of navigational channels and the destruction of natural barriers such as sand dunes pose significant problems in that any corrective action taken is generally quite costly and provides only a temporary solution.

Many of the prior art attempts directed to these problems have taken the form of groins, jetties, weirs, breakwaters or the like. Such devices have generally only been effective as short-term expedients, and in some cases have suffered from the further disadvantages of being unwieldy, of substantial size, and often aesthetically unattractive.

A significant advance toward the objectives of preserving shorelines, dunes and/or navigational channels under either prevailing or variable ambient conditions is disclosed in my U.S. Pat. No. 3,913,333, granted Oct. 21, 1975, and which is incorporated herein by reference. As is set forth in the noted patent, there is provided a plurality of flow control modules, each of which preferably takes the form of a unitary structure divided by spaced internal ribs and closed at its extreme ends by walls. Each module is shaped to present a concave inner front surface and a convex rear surface.

While the modules disclosed in my earlier patent are effective to deposit entrained alluvium from incoming ocean waves as is indicated in FIGS. 8 and 9 of the patent drawings, and are also effective to deposit and form further alluvium mounds from backwash as is also shown in the same views, it is natural to assume that some improvements can be made in the general structure of the patented modules by a person skilled in the art. First, for certain applications it is highly desirable that the module take the form of individual segments or sections which can be separately transported to the site and there assembled without total reliance upon heavy equipment. Second, many applications exist wherein there is not required multidirectional mounting of the module utilizing anchor pins and a mounting platform as shown in the patent drawings.

Accordingly, there presently exists in the art of fluid current control a definite requirement for a module structure made up of individual segments separately cast or otherwise formed and which can be readily assembled at the site into a unitary body. Desirably, in the casting operation there can also be provided an integral and more sturdy anchoring foot on certain of the individual module segments.

It has also been found that the backside of the module need not be truly convex as shown in my earlier patent, and that the front face of the module can somewhat depart from the specific concavity shown therein. Additionally, by following the teachings of the instant invention the wave energies may be differently dissipated or suppressed and the mounds of alluvium configured somewhat differently from those shown in my earlier patent.

SUMMARY OF THE INVENTION

Each of the accomplishments set forth in U.S. Pat. No. 3,913,333 may be achieved by provision of a unitized module structure formed of individual end, middle and rib module sections. Each of these modules segments or sections when combined and secured to one another present along the back side a sloping rear face extending upwardly and connecting with a downwardly and forwardly facing front wall section which merges into a generally concave front wall connecting with a forwardly and downwardly directed sloping front wall section which terminates in a generally vertically disposed front wall portion. In the case of the rib and middle modules, the sloping downwardly directed front wall portion terminates in a longitudinally extending and generally triangularly-shaped foot member which may be forced downwardly in the sand beach during installation of the module segments and serves as a firm anchoring means for the unitized module structure.

As noted, each of the module segments presents a generally concave surface to the incoming waves, and desirably, when viewed from the side all module segments are configured so that the concavity is generally semi-circular or subtends an arc of about 180°. Also, when the end, rib and middle module segments are again viewed from the side, the noted downwardly sloping front wall portions thereof lie in a common plane. As will be described in detail hereinafter, the smooth and gently sloping contours of the mold segments individually and also when assembled into a unitary structure present no abutments or sharp unstanding surfaces to the incoming or onrushing waves. Accordingly, as the wave currents enter the concave surfaces of the modules, a smooth generally circular wave pattern is established and the entering particles or alluvium form a smooth mound along the front and lower sloping surface of each module. There is likewise along the rear sloping surfaces of the modules an energy reduction of the backwash from the beach and deposition of a further smooth mound of alluvium.

Additional features of this invention which will be brought out in further detail hereinafter is a novel mode of reinforcing the modules, and a method of forcing air from the modules during positioning or installation upon the sand bed to assure that a firm footing is provided for the modules and a smooth even bed provided.

BRIEF DESCRIPTION OF THE DRAWINGS

FIG. 1 is an end perspective view of the unitary module structure of this invention;

FIG. 2 is an end perspective view of a preferred form of middle module segment;

FIG. 3 is a like view of a rib module segment;

FIG. 4 is a front elevational view of an end module showing exemplary reinforcing means therein;

FIG. 5 is a vertical sectional view taken substantially along the line V—V of FIG. 4;

FIG. 6 is a side view partially fragmented of an exemplary form of end module and one arrangement of air purging in order to properly seat the module upon the sand base during installation;

FIG. 7 is a functional diagram of a control module of the present invention in a beach-mounted erosion control mode wherein the module extends above the water surface;

FIG. 10 is a functional diagram of an illustrative beach-erosion control array of control modules of the present invention.

DESCRIPTION OF PREFERRED EMBODIMENTS

Figure 8:
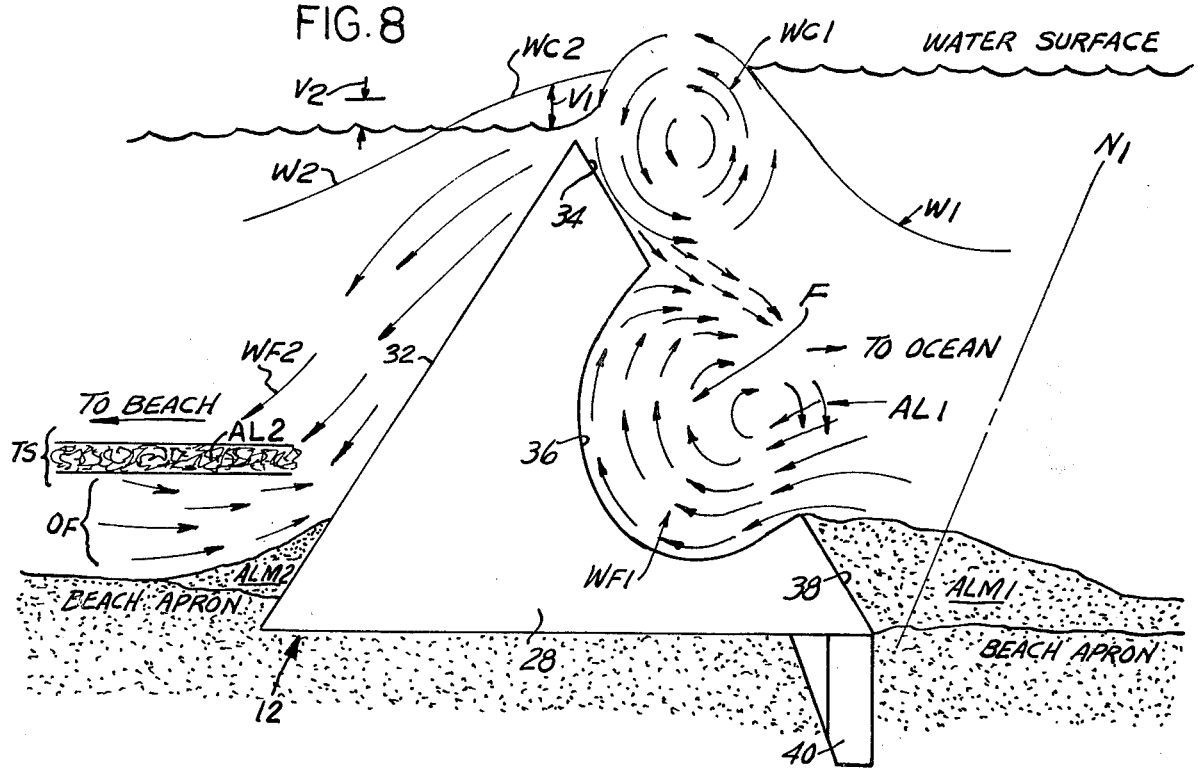
FIG. 8 is a functional diagram of a control module of the present invention in a subsurface or reef building erosion control mode.

Referring now first to FIG. 1 of the drawings, there is shown a unitary fluid current control module designated generally by the legend A. The module A in the arrangement shown comprises a pair of end modules 10a and 10b, a plurality of middle modules 12a, 12b and 12c, and a plurality of rib modules 14. In the specific configuration illustrated, the control module A includes at its opposite ends end modules 10a and 10b and it may further be seen from this view that the end modules 10a and 10b are separated from the rib modules 14 by a pair of middle modules 12a and 12b. Additionally, it may be noted that the rib modules 14 have positioned therebetween three middle modules 12a, 12b and 12c. While in the description above the modules 10, 12 and 14 are referred to as being separated or spaced from one another, it is to be emphasized that in actuality and as is shown in FIG. 1, the individual modules are in close side-by-side relation or in hugging contact with one another. One manner of tying the modules together will be described hereinafter.

FIGS. 4 and 5 further illustrate details of the exterior configuration of the end modules 10a and 10b and reference is accordingly also made thereto. Each of the end modules 10a and 10b are of identical construction, and each comprises a generally rectangular solid or imperforate base portion 16 constructed of concrete or like materials integral with a configured upstanding body portion 18. The body portion 18 is shaped on its back side to include an upwardly and forwardly directed sloping rear wall portion 20 connecting with a relatively short length downwardly and forwardly directed front wall portion 22. Also forming a part of the contoured end modules 10a and 10b is a generally concave front wall portion 24 connected at its upper end to the relatively short length downwardly directed wall portion 22 and at its opposite end to another short length downwardly and forwardly directed wall portion 26. As was noted earlier, the base portion 16 of each end module 10a and 10b is generally rectangular, and accordingly, the last mentioned front sloping wall portion 26 of the end module body portion 18 merges into and is integral with the vertical front face of the base portion 16.

The structural configuration of the middle modules 12 is further illustrated in perspective in FIG. 2, reference being now made thereto in conjunction with FIG. 1. As appears in the latter view, all of the middle modules are preferably of identical configuration. Each middle module 12 comprises a generally triangularly shaped body portion 28 having a relatively flat bottom wall portion 30 from which extends upwardly and inwardly a sloping wall portion 32 connected to a relatively short length downwardly and forwardly directed sloping wall portion 34 connecting with a concave arcuate or semi-circular front wall portion 36 which terminates in another short length downwardly and forwardly directed sloping wall portion 38. The middle module body portion 28 is integral with a generally triangularly shaped depending foot portion 40. As will be described later, the foot portion 40 of each middle module 12 provides an effective positioning, stabilizing and anchoring means for the middle modules 12 during and after installation.

A preferred configuration of the rib modules 14 is portrayed in perspective in FIG. 3 to which reference is now made in company with FIG. 1. Each rib module 14 is cast or otherwise formed of concrete and includes a generally triangularly shaped body portion 42 having a relatively flat base or bottom wall portion 44 connected to an upwardly and forwardly directed sloping rear wall portion 46 from which extends downwardly a relatively short length sloping front wall portion 48. The sloping front wall portion 48 has connected thereto a generally concave or arcuate front wall portion 50 connecting at its lower end with a downwardly directed relatively short length sloping wall portion 52. In like manner with the middle module 12, the rib module 14 has downwardly depending from its body portion 42 a generally triangularly shaped foot portion 54 which functions in a similar manner to the foot portion 40 of the middle module 12.

One important feature of the modules 10, 12 and 14 of the present invention is that each is cast or otherwise formed with novel reinforcing means. Referring again now to FIGS. 4 and 5 of the drawings, an examplary arrangement of reinforcing means for the end modules 10 is shown therein. Located within both the base portion 16 and body portion 18 of each end module 10 and located generally centrally between opposite end faces of the modules 10 is an inverted generally "L"-shaped reinforcing member 56. Also positioned within the body portion 18 of each end module 10 is a reinforcing member 58 which is generally U-shaped when viewed frontally as in FIG. 4. The reinforcing member 58 when viewed from the side of the end module of FIG. 5 includes a sloping wall segment 60 which follows generally the contours of the end module rear wall 20, the sloping leg section 60 of the reinforcing member 58 also being shaped with a pair of generally triangularly shaped leg segments 62 and 64 intermediate of which are base wall segments 66 and 68. Depending from the triangular front leg segment 64 of the reinforcing member 58 is a generally vertical leg segment 70 disposed within the end module body portion 16 and located generally parallel relation to the front face 16a of the body portion 16. As is believed now apparent, each of the end modules is cast with or otherwise has formed therewithin both of the reinforcing members 56 and 58, while the middle and rib modules 12 and 14 feature only the generally U-shaped reinforcing member 58.

It was noted in the introductory portion of this specification when reference was made to the fluid current control module of my earlier U.S. Pat. No. 3,913,333 that the unitary body 10 disclosed therein was contemplated to be cast of concrete as a single solid molded body and thus shipped as a unit to the installation site. It is quite apparent that for this purpose relatively heavy construction equipment is required, which may not at all times be readily available. Then too, a number of persons are required to properly position a composite module body in place and to assure that it is in a properly anchored and level position.

Each of the inconveniences noted in the preceding paragraph can be effectively overcome by molding, casting or otherwise forming the end, middle and rib modules of FIG. 1 individually and at the installation site tying them together into the unitary body of FIG. 1.

In the overall view of FIG. 1, and also in FIGS. 2, 3 and 5 which show details of the middle, rib and end modules 12, 14 and 10, respectively, there is designated by the numeral 72 a plurality of generally randomly located openings or passages extending through the body portions 18, 28 and 42 of the end, middle and rib modules, respectively, from one side face to the opposite side face thereof. If desired, there may be fed into each of the passages a length of plastic pipe or tubing, and a suitable material for this purpose is polyvinyl chloride tubing. Such tubing protects the integrity of the concrete material and provides a convenient passage for the passage through and location therewithin of cable or chain which are effective after assembly of the individual modules and their location in the final site to anchor one module to the other and restrain them against relative movement under the incoming and outgoing forces of ocean waves.

It may at times be desired in a situation where circumstances indicate that it would be more expedient to assemble the modules 10, 12 and 14 in side-by-side facing relationship, as in FIG. 1, and after tying the modules together by cable or chain means, to lower the module A of FIG. 1 into a tentative location just above the beach floor. As is believed quite apparent to a person familiar with this art, the sandy beach floor or base is not at all times completely level or flat. An effective expedient to assist in overcoming any leveling problems during positioning of the module A in place is to incorporate in each of the end modules 10a and 10b the arrangement of FIG. 6, which constitutes a modified form of the invention. As shown therein, the lower downwardly sloping wall portion 26 of each end module 10 is apertured as at 74 to receive therein plastic tubing 76 which communicates interiorly of the end module base portion 16 with branched plastic tubing 78 having a horizontal tubing segment 80 communicating with vertically downwardly depending leg segments 82. The plastic tubing 76, which may be formed of a material such as polyvinyl chloride, is effective when connected to a source of compressed air to blow away from the beach surface upon which the module A is to be located any undesired sand or the like which might constitute interference with the desired level or even positioning of the module.

The desirable results which are accomplished in controlling fluid currents such as winds, tides, and the like to selectively enhance, modify, or reverse the natural erosion processes effected by such currents can first be seen by reference to FIG. 7. In this portrayal an end module 10 has been selected, however, it will readily be appreciated as the description proceeds that like or possibly even better results can be achieved if the functional diagram was instead directed to a middle module 12 or rib module 14.

In the configuration shown in FIG. 7, it will be assumed that an incoming wave W from the ocean will have its crest portion WC and its foot portion WF breaking into the open front face F of the module 10 against the concave inner surface 24 thereof.

It is to be further assumed as this description proceeds that the end module 10 shown is only a part of the total module structure A, and accordingly, the wave pattern shown will be effected by the somewhat different concavity of the rib modules 14 which contribute to causing the counter-clockwise circulation shown in FIG. 7. In other words, the breaking crest WC of the wave W as it enters the open front F of the module 10 beneath the lower end of the upper sloping wall portion 22, reacts with the concave inner surface 24 to create the counter-clockwise circulation shown. While this action is occurring, the energy in the rising foot WF of the breaking wave W is reacting with the sloping wall surface 26 and the concave inner surface 24 of the module 10 such that a clockwise circulation is created.

Accordingly, approximately in a plane defined by the broken line N, the energies of the crest WC and the foot WF are in opposition, thereby causing a dissipation or mutual suppression of the energy of both components of the wave W and causing entrained alluvium AL therein to sink or fall to the shoreline or ocean bottom immediately in front of the module 10 and particularly in the region of the vertical wall section 16a of the module base portion 16. In this general location, the alluvium AL tends to form a mound ALM of such material.

During sufficiently high water conditions, the rear surface 20 of the module 10 also reduces the energy of backwash from the beach and causes further deposition of alluvium at the rear of the module as illustrated by the mound ALM2.

In a subsurface mode of operation, the unitary module structure A performs a similar function to build up alluvium on the underwater apron of the beach as will now be described with reference to FIG. 8. While the fluid flow pattern and directions of the wave patterns will generally be the same throughout the total length of the module structure A, for ease of illustration of this control mode, a middle module 12 has been selected.

A standing wave portion W1 is shown approaching the module 12 and generally immediately adjacent the open front F thereof. The wave pattern W1 includes a crest portion WC1 and a foot portion WF1 which by the nature of such standing wave patterns leads the crest WC1 into the module 12. Thus, the energy of the foot portion WF1 reacts with the concave surface 36 of the module 12 to create a clockwise circulation which opposes the energy of the crest portion WC1 to a substantial degree, and accordingly, this results in the establishment of an imaginary plane defined by the broken line N1 immediately in front of the module 12.

As a result, the kinetic energy of the foot portion WF1 turned on itself and the kinetic energy of the crest portion WC1 dissipated, the amplitude of the standing wave W1 is materially reduced from an above-surface amplitude V1 in the region of the open front F of the module 12 to a reduced above-surface amplitude V2 generally adjacent the rear surface 32 of the module 12, as is shown by the wave W2 and wave crest WC2.

Due to the backwash or outflowing current OF from a shoreline located to the rear of the module 12, there is a stratification of the outflowing current OF and the incoming wave W2 at the rear of the module which creates a turbulent strata or barrier layer TS therebetween, the latter having a substantial entrained alluvium AL2 content.

As is shown by suitable flow arrows adjacent the smoothly sloping rear surface 32 of the module 12, the downwardly directed energy of the modified crest WC2 and the energy of the outflowing current OF are opposed at and below the turbulent layer TS, causing a marked reduction in kinetic energy in this region and a release of the entrained alluvium AL2 in the turbulent layer TS, causing it to be deposited at the base of the rear surface 32, thereby forming a mound ALM2 of alluvium.

The deposition of alluvium AL1 in front of the module 12 forms another mound ALM1 of alluvium adjacent the sloping front surface 38 of the base portion 28 of the module 12. This mound ALM1 is largely created by the reduction in kinetic energy in the wave foot WF1 in the vicinity of the plane N1 which causes entrained alluvium to be released from the wave W1.

The severe loss in kinetic energies from the wave W1 (WC1, WF1) to the modified or attenuated wave W2 (WC2, WF2) results in a corresponding reduction in forward velocity of the wave W1 such that the wave W2 approaches the beach at markedly reduced velocity.

Figure 9:
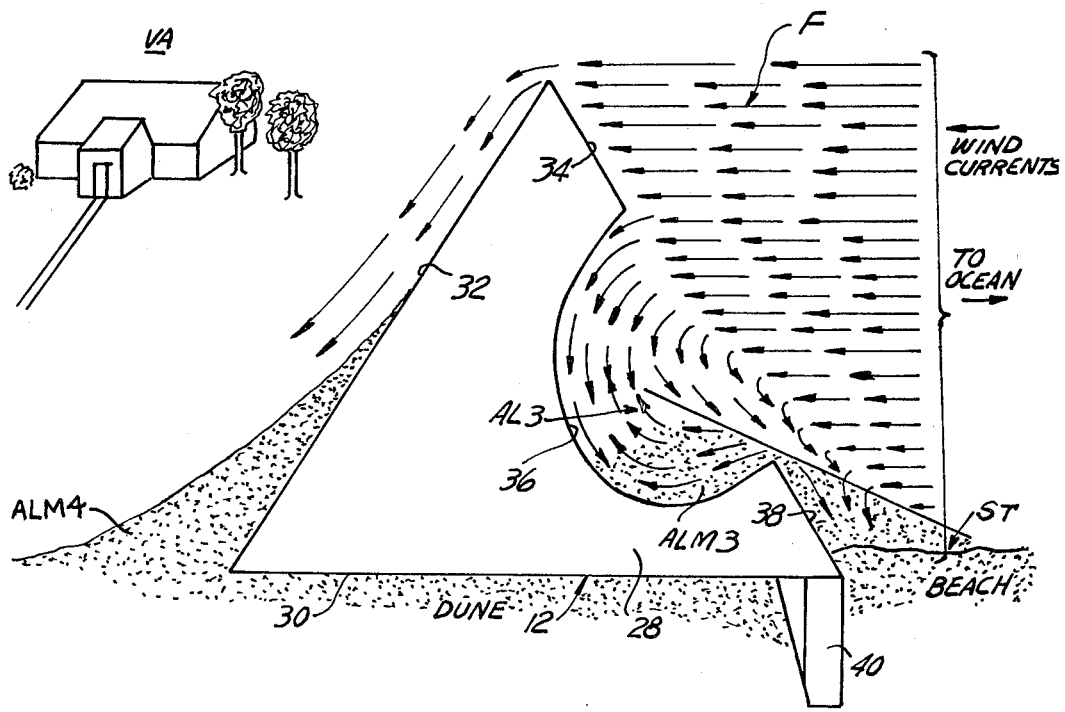
FIG. 9 is a functional diagram of a control module of the instant invention shown as reacting with winds or air currents in a dune erosion control mode.

The control module A of the present invention is also effective in reacting with winds or air currents in a dune erosion mode by reducing wind energies and depositing air-entrained alluvium. This is shown in FIG. 9 of the drawings, and again, a middle module 12 has been selected for purposes of illustration, although it will be appreciated that similar advantageous results are achieved with end or rib modules.

It is assumed for purposes of a description of the instant invention that the module 12 is located upon a sand dune or the like between a beach and a vegetated and/or structurally developed area VA with the open face F of the module 12 facing the prevailing wind direction coming off the ocean, so that surface turbulence ST will cause asportation and entrainment of alluvium from the surface of the beach or the like into the wind currents. As the airborne alluvium gains altitude, its velocity increases, which would normally carry it far inland and cause wind erosion of the dunes and beach and unwanted deposition of the alluvium over inland areas.

As the wind currents enter the front F of the module 12, however, the various currents over the altitude between the upper edge of the sloping front wall portion 38 of the module base portion 30 and the lower end of the upper sloping wall portion 34 of the module counter-react with the concave inner surface 36 to oppose one another within the module 12, thereby substantially reducing the kinetic energy of the wind currents. This causes the entrained alluvium AL3 therein to form a mound ALM3 of such material in and to the front of the module 12.

The rear surface 32 of the module 12 also acts to constrain the force of some of the wind currents downwardly therealong and into an area between the rear surface 32 and the protected area VA. This redirection of the wind forces airentrained alluvium down toward the ground surface causing a certain amount of alluvium deposition to form a mound ALM4 immediately behind the module 12. The smooth sloping surface 32 and the resulting minor undercut assist in trapping alluvium at the rear of the module 12 and the dune on which this module is situated, so that the dune structure is both preserved and caused to build up under the prevailing wind conditions shown. Also, the area VA is materially enhanced by the attenuation effects of the module 12 on these wind currents. Additionally, in the event of severe storms, waves cresting over the dune will be substantially attenuated by the module 12, and the resulting action of the module to accrete fluid-entrained alluvium will continue to preserve the dune regardless of the fluid medium to which the dune is subjected.

The operation of the unitary control module A of the present invention have been described under various ambient conditions, however, these modules may also be utilized in predetermined combinations to effect specific control functions. A system of control modules A providing a beach and shoreline erosion control function is shown in FIG. 10, to which reference is now made.

For purposes of illustration and description, fixed conditions are assumed in which the wave motion from the ocean is substantially normal to the beach and shoreline. For this purpose, a plurality of control modules A-1, A-2, A-3 and A-4, the former pair (A-1, A-2) comprising a first row of spaced modules parallel to the beach and the latter pair (A-3, A-4) comprising a second row of spaced modules parallel to the beach with the modules in one row respectively staggered between the modules of the other laterally along the beach. The open fronts F-1, F-2, F-3 and F-4, respectively, of the modules A-1 to A-4 face the ocean and the back surfaces B-1 to B-4 thereof face the beach.

In this configuration, the modules A-1 to A-4 selectively impede the incoming wave action and no given row in the array is exposed to the full force of the incoming waves. Also, while only four modules are shown, it is to be clearly understood that both rows of modules can include as many modules as desired to protect any given extent of beach and shoreline. Further, additional rows of the modules A can be added as long as a staggered configuration and spacing is maintained.

The operation of each of the individual modules A-1 to A-4 in the protective array of FIG. 10 is as described in either of the FIGS. 7 and 8 depending upon the depth of the water in which they are placed. Assuming that the modules A-1 and A-2 (and others in the row defined thereby) are beneath the surface, as in FIG. 8, and that the modules A-3 and A-4 are at the mean average water line or breaking surf line, as in FIG. 7, the action of the row A-1 and A-2 is to attenuate an incoming wave W4 to create a modified wave front W5 which is attenuated by the second row of modules A-3 and A-4.

The direct action of the incoming wave W4 is indicated by the flow paths E1 in FIG. 10, secondary diverting affects of the modules A are indicated by the flow paths E2, and the reverse reaction effects of each of the modules A-1, A-2, A-3 and A-4 on a given portion of the waves W4 and W5 are shown by the flow paths E3. Thus, it can be seen that certain portions of the wave front W4 impinge directly upon the modules A-1 and A-2 in flow paths E1 and are diverted between said modules in the first row to the modules A-3 and A-4 in the flow paths E2, and counter-react to attenuate energy from the wave W4 and cause accretion of alluvium via the paths E3.

Certain direct components E1 of the wave W4 passing between the modules A-1 and A-2 in the first row impinge directly on the modules A-3 and A-4 in the second row, resulting in the attenuation and accretion of flow paths E3 at the latter modules. The secondary flow paths E2 are caused to criss-cross and interfere with normal wave motion by both rows of the modules A-1 and A-2 and A-3 and A-4 to further break up the wave fronts W4 and W5 to preclude the establishment of normal flow and rhythm of the waves impinging on the beach.

Backflow from the beach is handled by the modules A-1 to A-4 in a similar manner and causes accretion of alluvium as previously described with reference to FIGS. 7 and 8. Of course, an additional row of modules A can be placed on the beach itself to compensate for both wind and high water conditions if desired.

All of the foregoing actions of wave energy attenuation, alluvium accretion and consequent retention of alluvium to preserve the beach, and the creation of attenuating cross currents to disrupt the normal flow and rhythm of the incoming waves are accomplished without subjecting any given module A-1 to A-4 or a row of modules to the full force and effect of an incoming wave W4. The staggered arrangement of the modules A-1 to A-4 in their respective rows effectively accretes alluvium from the incoming wave W4 and its backwash from the beach in increments of a size determined by the size of the modules and the spacing therebetween. Naturally, under particular conditions there can be additional rows of modules A placed in the configuration of FIG. 8 to provide additional attenuation to incoming waves W4 in the manner of a protective reef.

It is also within the contemplation of this invention that the modules A can be arranged in arrays which tend to accumulate alluvium to modify existing shorelines by the creation of sandbars, shoals or peninsula-type extensions of the shorelines in topographical configurations determined by the configuration of a given array of modules. Since such a system or array of modules is adequately shown and described in FIG. 12 of my U.S. Pat. No. 3,913,333, it is not believed that repetition is necessary herein and my noted patented disclosure is accordingly herein incorporated by reference.

Similarly, the novel concepts of the instant invention are also of important application in preventing the closure of navigational channels such as those between bays, harbors or backwaters and the ocean. These channels fill with silt and require periodic and expensive dredging operations in order to maintain them in a navigable condition. A typical array or system of modules for this purpose is clearly described and illustrated in FIG. 13 of my earlier mentioned U.S. Pat. No. 3,913,333. Again, it is not believed necessary that this disclosure be repeated herein since the effect of the modules 10D1 and 10D8 on the shoals S1 and S2 would be the same as with the unitary modules A of this invention made up of a plurality of tied-together end, middle and rib modules 10, 12 and 14, respectively. Accordingly, the disclosure of my earlier patent dealing with navigational channel enhancement is incorporated herein in its entirety by reference.

The foregoing specification and drawings illustrate the ability of the present invention to harness the tremendous energies present in the tides to control the effects thereof in order to produce useful results in the preservation, creation and maintenance of shorelines, navigational channels and the like. The present invention solves long-standing problems in the art and satisfies the attendant long-felt need for straight-forward relatively economical solutions to the problems of shoreline and navigational channel erosion and maintenance.

It has been pointed out hereinabove that the modules 10, 12 and 14 would generally be cast into solid concrete shapes. However, it is within the contemplation of this invention that the concrete shapes may be hollow and filled with sand or like substances at the situs of installation. As a further alternative, the modules could be formed of metal or plastic, again as hollow shapes, and the cavities filled with sand, gravel or the like through openings in the top portions of the modules. The openings so provided could then be latter plugged or covered with screen cloth.

Various changes have been discussed in the structures herein disclosed and these and other modifications may of course be effected without departing from the spirit of the invention or the scope of the subjoined claims.

What is claimed is:

1. A method of controlling current flow of fluids having alluvium entrained therein, which comprises introducing into the path of an oncoming flowing fluid a shaped object having an interrupted front wall, said interrupted front wall being provided with a pair of spaced-apart, forwardly and downwardly directed sloping surfaces and a connecting concave surface, both of said sloping surfaces being substantially flat and extending across a common plane, said sloping and said concave surfaces being so disposed with respect to one another as to reverse the flow path of said fluid upon itself to deposit adjacent one of said sloping surfaces alluvium entrained therein, said object also having a relatively massive rear wall presenting an upwardly and forwardly directed planar surface, the top longitudinal edge of said rear wall forming a vortex along the top longitudinal edge of said front wall, and said rear wall receiving an oppositely flowing fluid and also being effective to cause deposition of alluvium entrained therein.

2. A method of controlling current flow of fluids having alluvium entrained therein, which comprises introducing into the path of an oncoming flowing fluid a plurality of shaped objects in close side-by-side relation, each of said objects having an interrupted front wall, said interrupted front wall being provided with a pair of spaced-apart, forwardly and downwardly directed sloping surfaces and a connecting concave surface, both of said sloping surfaces being substantially flat and extending across a common plane, said sloping and said concave surfaces being so disposed with respect to one another as to reverse the flow path of said fluid upon itself to deposit adjacent one of said sloping surfaces alluvium entrained therein, each of said objects also having a relatively massive rear wall presenting an upwardly and forwardly directed planar surface, the top longitudinal edge of said rear wall forming a vortex along the top longitudinal edge of said front wall, and said rear wall receiving an oppositely flowing fluid and also being effective to cause deposition of alluvium entrained therein.

3. A method of controlling current flow of fluid having alluvium entrained therein, which comprises introducing into the path of an oncoming flowing fluid a shaped object having an interrupted front wall, said interrupted front wall being provided with a pair of spaced-apart, forwardly and downwardly directed sloping surfaces and a connecting concave surface, both of said sloping surfaces being substantially flat and extending across a common plane, one of said sloping surfaces terminating in an upstanding front wall surface, said sloping and said concave surfaces being so disposed with respect to one another as to reverse the flow path of said fluid upon itself to deposit closely adjacent said upstanding front wall surface alluvium entrained therein, said object also having a relatively massive rear wall presenting an upwardly and forwardly directed planar surface, the top longitudinal edge of said rear wall forming a vortex along the top longitudinal edge of said front wall, and said rear wall receiving an oppositely flowing fluid and also being effective to cause deposition of alluvium entrained therein.

4. A method of controlling current flow of fluids having alluvium entrained therein, which comprises introducing into the path of an oncoming flowing fluid a plurality of shaped objects in close side-by-side relation, each of said objects having an interrupted front wall, said interrupted front wall being provided with a pair of spaced-apart, forwardly and downwardly directed sloping surfaces and a connecting concave surface, one of said sloping surfaces terminating in an upstanding front wall surface, said sloping and said concave surfaces being so disposed with respect to one another as to reverse the flow path of said fluid upon itself to deposit closely adjacent said upstanding front wall surface alluvium entrained therein, each of said objects also having a relatively massive rear wall presenting an upwardly and forwardly directed planar surface, the top longitudinal edge of said rear wall forming a vortex along the top longitudinal edge of said front wall, and said rear wall receiving an oppositely flowing fluid and also being effective to cause deposition of alluvium entrained therein adjacent the lower end of said uninterrupted surface along the base of said rear wall.

5. Apparatus for controlling current flow of fluids having alluvium entrained therein, comprising a shaped structure configured to present in side elevation a relatively massive rear wall portion and an interrupted front wall portion, said front wall portion being provided with a pair of spaced-apart forwardly and downwardly directed sloping surfaces and a connecting concave surface, both of said sloping surfaces being substantially flat and extending across a common plane, said shaped structure being effective when located in opposed paths of fluid flow to interrupt by said front wall portion one of said paths of fluid flow to effect reversal thereof, causing alluvium entrained therein to be deposited adjacent the bottom of said front wall portion, said rear wall portion presenting an upwardly and forwardly directed planar surface, the top longitudinal edge of said rear wall forming a vortex along the top longitudinal edge of said front wall, and said rear wall interrupting an opposed path of fluid flow to cause alluvium entrained therein to be deposited adjacent the bottom of said rear wall portion.

6. Apparatus for controlling current flow of fluids having alluvium entrained therein, comprising a shaped structure which includes a plurality of connected modular elements each of which is configured to present in side elevation a relatively massive rear wall portion and an interrupted front wall portion, said front wall portion being provided with a pair of spaced-apart forwardly and downwardly directed sloping surfaces and a connecting concave surface, both of said sloping surfaces being substantially flat and extending across a common plane, each of said modular elements also having a base portion connected to said front and rear wall portions, said shaped structure being effective when located upon the base portions of each of said modular elements to interrupt by said front wall portion one of said paths of fluid flow to effect reversal thereof, causing alluvium entrained therein to be deposited adjacent the bottom of said front wall portion, said rear wall portion presenting an upwardly and forwardly directed planar surface, the top longitudinal edge of said rear wall forming a vortex along the top longitudinal edge of said front wall, and said rear wall interrupting an opposed path of fluid flow to cause alluvium entrained therein to be deposited adjacent the bottom of said rear wall portion.

7. Controlling apparatus of the character defined in claim 6 in which the base portion of certain of said modular elements includes an integral shaped foot portion for positioning, stabilizing and anchoring said shaped structure.

8. Apparatus for controlling current flow of fluids having alluvium entrained therein, comprising a unitary modular structure which includes a plurality of modular elements adapted to be positioned in close side-by-side relation, each of said elements having a base portion, a relatively massive rear wall portion presenting an upwardly and forwardly directed planar surface, the top longitudinal edge of said rear wall forming a vortex along the top longitudinal edge of said front wall, and said front wall portion contoured to include a pair of spaced-apart, forwardly and downwardly directed sloping surfaces and a connecting concave surface, both of said sloping surfaces being substantially flat and extending across a common plane, each of said modular elements being effective when located in opposed paths of fluid flow to interrupt by said front wall one of said paths of fluid flow to effect reversal thereof, causing alluvium entrained therein to be deposited along said base portion of each of said modular elements, said rear wall portion interrupting an opposed path of fluid flow to cause alluvium entrained therein to be deposited adjacent the bottom of said rear wall portion of each of said modular elements.

9. Controlling apparatus as set forth in claim 6, in which the base portion of certain of said modular elements includes an integral shaped foot portion for positioning, stabilizing and anchoring said unitary modular structure.

10. Controlling apparatus of the character defined in claim 6, which includes reinforcing means interiorly of the shaped structure for rigidifying said front and rear wall portions.

11. Controlling apparatus as set forth in claim 8, which includes reinforcing means interiorly of each of said modular elements for rigidifying said front and rear wall portions.

12. Controlling apparatus as defined in claim 5, in which the shaped structure includes a base portion having internal passages for forcing fluid therethrough under pressure to force away from the situs of said shaped structure any unwanted particulate material prior to seating of said structure.

13. Controlling apparatus as defined in claim 5, in which the shaped structure includes a base portion having an integral foot member for positioning, stabilizing and anchoring said shaped structure.

* * * * *